United States Patent
Maeda

(10) Patent No.: US 6,580,679 B1
(45) Date of Patent: Jun. 17, 2003

(54) RECORDING MEDIUM, REPRODUCTION METHOD/ APPARATUS WITH MULTIPLE TABLE OF CONTENTS

(75) Inventor: Muneyasu Maeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/287,839

(22) Filed: Apr. 7, 1999

(30) Foreign Application Priority Data

Apr. 10, 1998 (JP) .......................................... 10-099686

(51) Int. Cl.$^7$ ................................................. G11B 7/00
(52) U.S. Cl. ................................. 369/275.3; 369/47.27; 369/94
(58) Field of Search ......................... 369/275.3, 47.21, 369/94, 47.22, 47.27, 47.33

(56) References Cited

U.S. PATENT DOCUMENTS

| | | | | |
|---|---|---|---|---|
| 5,268,889 A | * | 12/1993 | Furukawa et al. | 369/47 |
| 5,466,883 A | * | 11/1995 | Miyashita et al. | 369/47 |
| 5,544,139 A | | 8/1996 | Aramaki et al. | 369/58 |
| 5,608,715 A | * | 3/1997 | Yokogawa et al. | 369/275.1 |
| 5,670,730 A | * | 9/1997 | Grewe et al. | 84/60 |
| 5,726,960 A | * | 3/1998 | Yoshida et al. | 369/34 |
| 5,768,252 A | * | 6/1998 | Yokota | 369/275.3 |
| 5,825,731 A | * | 10/1998 | Yokota | 369/32 |
| 5,920,541 A | * | 7/1999 | Sasaki et al. | 369/275.3 |
| 6,067,282 A | * | 5/2000 | Moriyama et al. | 369/58 |
| 6,147,940 A | * | 11/2000 | Yankowski | 369/30 |

FOREIGN PATENT DOCUMENTS

| | | | | |
|---|---|---|---|---|
| EP | 9311758 | | 10/1993 | |
| EP | 0718845 | | 12/1995 | |
| EP | 0783167 | | 3/1996 | |
| EP | 9611937 | | 12/1996 | |
| GB | 9717465 | | 8/1997 | |
| JP | 5-290382 | * | 11/1993 | 369/32 |

\* cited by examiner

Primary Examiner—Nabil Hindi
(74) Attorney, Agent, or Firm—Jay H. Maioli

(57) ABSTRACT

A recording medium including a program region for recording a plurality of files, a first management region for management of a file-related information for the plurality of files, and a second management region for management of a medium-related information for a plurality of recording media used for recording a recording content. A reproduction method and apparatus for reproducing the aforementioned recording medium is also provided.

6 Claims, 6 Drawing Sheets

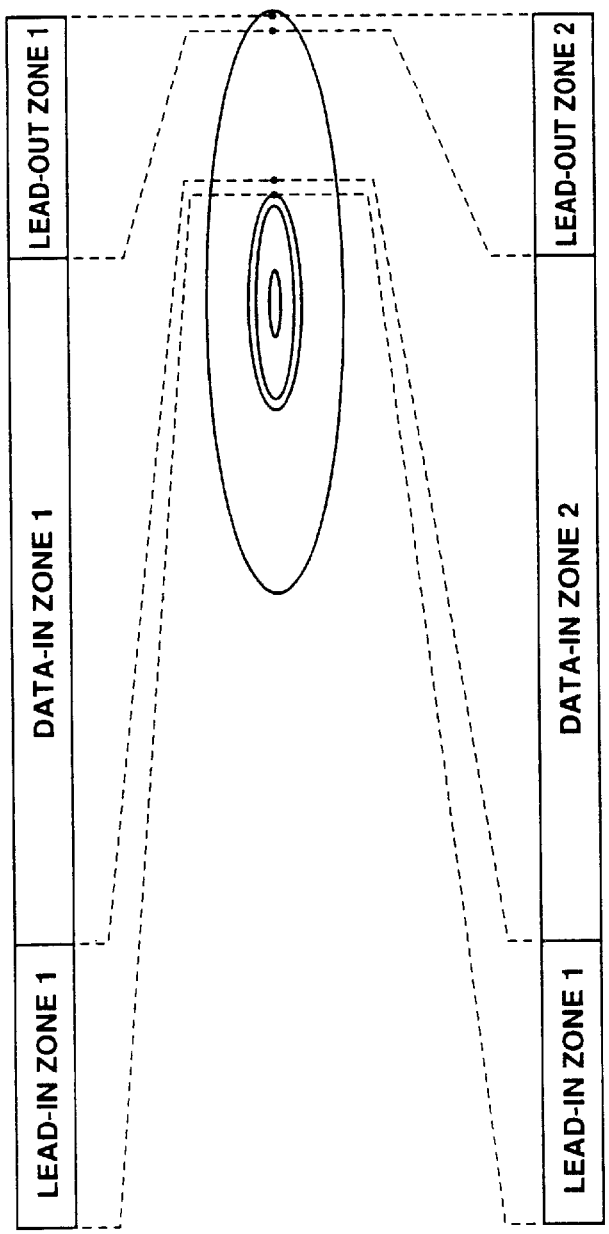
FIG.2A CD LAYER
FIG.2B HD LAYER

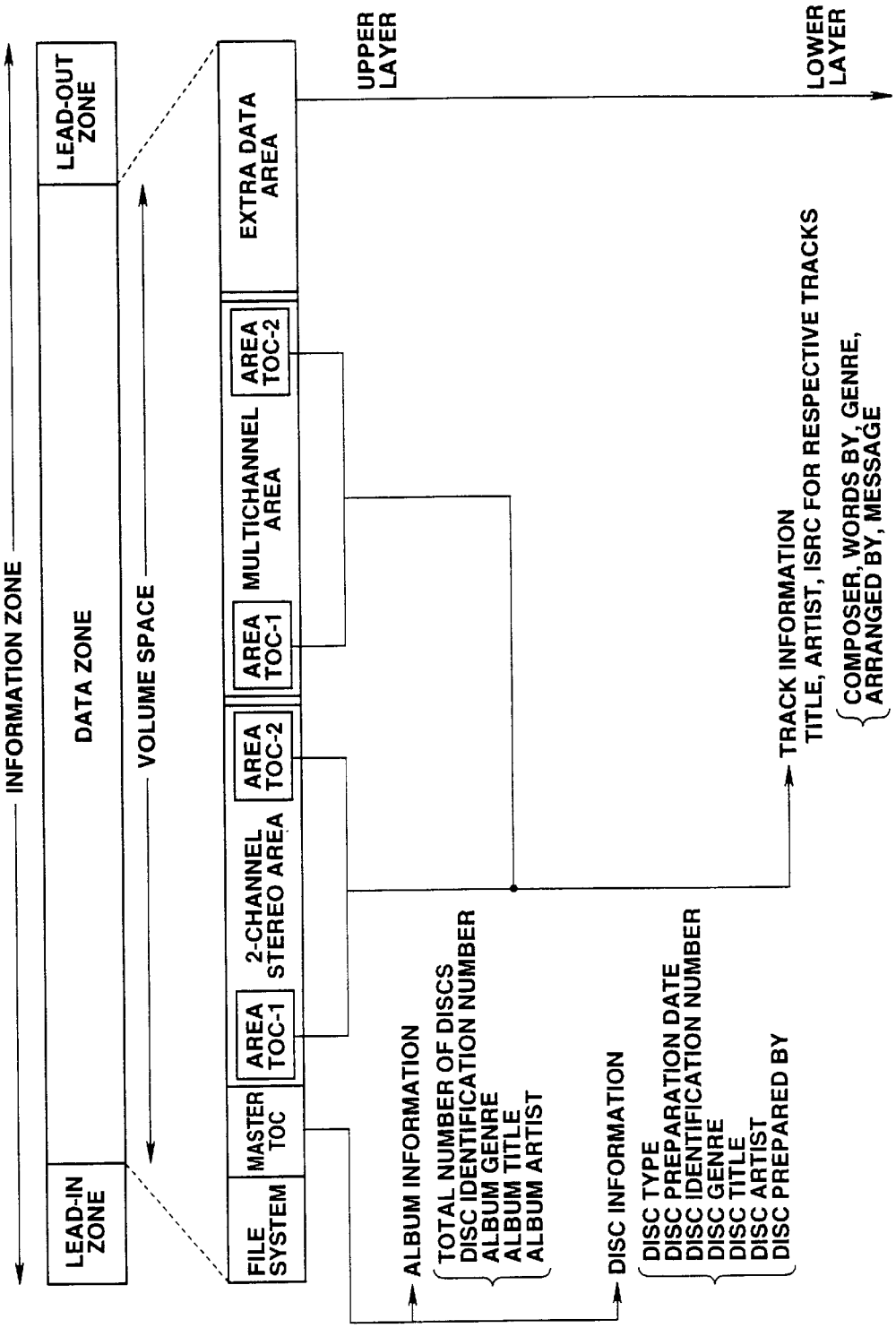

| 1 | NOT USED |
|---|---|
| 2 | NOT DEFINED |
| 3 | ADULT CONTEMPORARY |
| 4 | ALTENATIVE ROCK |
| 5 | CLASSICAL |
| 6 | CONTEMPORARY CHRISTION |
| 7 | COUNTRY |
| ⋮ | ⋮ |

RECORDING MEDIUM, REPRODUCTION METHOD/APPARATUS WITH MULTIPLE TABLE OF CONTENTS

BACKGROUND OF THE INVENTION

1. Field of the Invention

The present invention relates to a recording medium for recording a program information in its program area as well as an information inherent to the medium and an information related to the program, and to a reproduction apparatus and method for reproducing from this recording medium the program information, the information inherent to the medium, and the program-related information.

2. Description of the Prior Art

Conventionally, there is a type of compact disc (CD) called CD-text capable of recording a text information such as a disc title and genre information in alphanumerics and Kanzi (Chinese characters) together with a music information. This CD-text is disclosed, for example by U.S. Pat. No. 5,825,731 filed on Nov. 27, 1996 by the applicant of this invention. This CD-text can record one genre information for a disc but cannot record a genre information for the respective tracks.

There is now a desire for recording a genre information for each of the tracks because the genre information is substantially an information belonging to a track. Moreover, if a track contains a plurality of genres, it is preferable to record the plurality of genres, but only one of them can be recorded at a time. The user may forget music information of the other genres. Moreover, it has been impossible to record genre information for an album consisting of a plurality of discs. For example, there has been no way to cope with a disc such as an omnibus album containing a plurality of genres and a plurality of artists.

Furthermore, music genres such as classical and jazz originally depend on the cultural areas such as the country and region, and some genres uniquely belong to specific countries. For example, Japan has a music genre called Enka, popular ballads sung by street singers. Furthermore, each country has its folk music. However, there has been no discs to cope with a collection of different countries having different genres.

SUMMARY OF THE INVENTION

It is therefore an object of the present invention to provide a recording medium capable of recording a program-related information for an information recorded on each of the tracks and a disc-related information inherent to a recording medium such as a disc as well as a representative information when a recording content is recorded over a plurality of recording media.

Another object of the present invention is to provide a reproduction apparatus and method, enabling to perform various types of retrieval using the aforementioned information items when reproducing the aforementioned recording medium.

The recording medium according to the present invention includes: a first management region containing a representative information for representing a plurality of recording media on which a recording content are to be recorded, and a medium-specific information inherent to the respective recording media; a second management region containing a program-related information related to respective programs to be recorded on the recording medium; and a program region containing the programs. This enables to effectively record layered information items.

Here, the representative information is one selected from a group consisting of an album title, a total number of sets, a musician name, a genre name, and a product identification number. Moreover, the representative information can contain a plurality of genre names. Moreover, the genre names can be loaded by specifying a genre table and specifying a genre index.

Moreover, the medium-specific information is one selected from a group consisting of a disc title, a musician name, a serial number, a genre name, a recording date, and a recording author. Moreover, the medium-specific information can contain a plurality of genre names. Moreover, the genre names can be loaded by specifying a genre table and specifying a genre index.

Moreover, the program-related information is one selected from a group consisting of a program title, a musician name, a words author, a music composer, an arranger, a message, a genre name, and an International Standard Recording Code (ISRC). Moreover, the program-related information can contain a plurality of genre names, which can be loaded by specifying a genre table and specifying a genre index.

The reproduction apparatus according to the present invention is for reproducing an information from a recording medium having: a first management region containing a representative information for representing a plurality of recording media on which a recording content are to be recorded, and a medium-specific information inherent to the respective recording media; a second management region containing a program-related information related to respective programs to be recorded on the recording medium; and a program region containing the programs, the apparatus including: reproduction means for reproducing the representative information and the medium-specific information recorded in the first management region and the program-related information recorded in the second management region; storage means for storing the representative information and the medium-specific information recorded in the first management region and the program-related information recorded in the second management region; and display means for selectively displaying the representative information, the medium-specific information, and the program-related information.

Accordingly, the user can perform various types of retrieval and reproduction watching the display means.

Moreover, the reproduction method according to the present invention is for reproducing an information from a recording medium having: a first management region containing a representative information for representing a plurality of recording media on which a recording content are to be recorded, and a medium-specific information inherent to the respective recording media; a second management region containing a program-related information related to respective programs to be recorded on the recording medium; and a program region containing the programs, the method including steps of: reproducing the representative information and the medium-specific information recorded in the first management region and storing the representative information and the medium-specific information recorded in the first management region which has been reproduced; reproducing the program-related information recorded in the second management region and storing the program-related information recorded in the second management region which has been reproduced; and selectively displaying the representative information, the medium-specific information, and the program-related information.

BRIEF DESCRIPTION OF THE DRAWINGS

FIG. 2A shows configuration of a data recorded on a CD layer 101 shown in FIG. 1.

FIG. 2B shows configuration of a data recorded on a HD (high density) layer 102 shown in FIG. 1.

FIG. 3A shows configuration of a data recorded on a HD layer 102 shown in FIG. 1.

FIG. 3B shows a detailed data configuration in a data zone in FIG. 3A.

FIG. 3C is a detailed table of data recorded in the Master TOC (table of contents) in FIG. 3B.

DETAILED DESCRIPTION OF PREFERRED EMBODIMENTS

Figure 1:
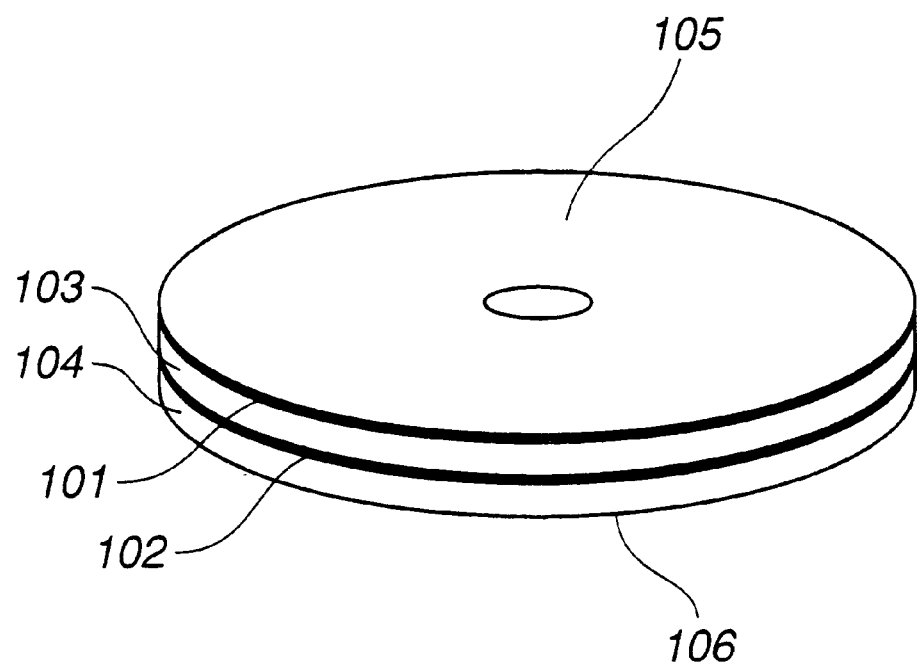
FIG. 1 shows a two-layered disc configuration according to the present invention.

FIG. 1 shows configuration of a multi-layered disc applied to a reproduction apparatus according to the present invention. As shown in FIG. 1, the multi-layered disc is an optical disc having a diameter of 12 cm and a thickness of 1.2 mm. Moreover, the multi-layered disc includes a label surface 105 as a top surface, a CD layer 101, a CD substrate 103, a high density (HD) layer 102, an HD substrate 104, and a read surface 106.

As can be seen from the aforementioned configuration, two layers, i.e., the CD layer 101 and the HD layer 102 serve as recording layers. The CD layer 101 contains a 16-bit digital audio signal which has been sampled with 44.1 KHz as in a conventional CD. The HD layer 102 serves for recording a one-bit digital audio signal which has been $\Delta\Sigma$ modulated with a very high sampling frequency of 2.842 MHZ which is 16 times higher than the aforementioned 44.1 KHz.

As for the frequency band, the CD layer 101 realizes 5 to 20 KHz, and the HD layer 102 can realize a wide frequency band of 100 KHz from a DC component.

As for the dynamic range, the CD layer realizes 98 dB over the entire audio band, and the HD layer can realize a frequency band of 120 dB over the audio band.

The CD layer 101 has a minimum pit length of 0.83 micrometers, whereas the HD layer 102 has a minimum pit length of 0.4 micrometers The CD layer 101 has a track pitch of 1.6 micrometers, whereas the HD layer has a track pitch of 0.74 micrometers.

As for the read-out laser wavelength, the CD layer 101 uses 780 nm, and the HD layer 102 uses a reduced wavelength of 650 nm.

Furthermore, the optical pickup lens numerical aperture ratio (NA) is 0.45 for the CD layer 101, and 0.6 for the HD layer.

Hereinafter, the 64-Fs 1-bit audio signal which has been $\Delta\Sigma$ modulated to be recorded on the aforementioned HD layer 102 will be referred to as a high-speed 1-bit audio signal.

As shown in FIG. 1, one of the layers of the disc is used for recording a digital signal of a recording form identical to a single-layered compact disc available on the market, and the other layer is used for recording a digital signal by a recording form of a higher quality than the single-layered compact disc. Accordingly, CD players all over the world can at least reproduce the CD layer 101, and a reproduction apparatus compatible for the aforementioned HD layer can reproduce both of the CD layer 101 and the HD layer 102.

Moreover, the reproduction apparatus compatible with the HD layer can reproduce single-layered compact discs which have been already spread all over the world.

The aforementioned optical disc includes: a program region for recording the aforementioned high-speed 1-bit audio signal; a first management region for use when a plurality of these optical discs are prepared to constitute an album, so as to record a representative album information representing the plurality of optical discs and a series of disc information inherent to the respective discs; and a second management region for recording a track information corresponding to each of the programs (files) recorded on this optical disc.

Hereinafter, explanation will be given for a specific example of a hybrid optical disc having both the aforementioned high density (HD) recording layer for recording the aforementioned high-speed 1-bit audio signal or the like, and the CD layer for recording an audio signal or the like for a compact disc.

Firstly, explanation will be given for the hybrid optical disc with reference to FIGS. 2A and 2B. In this hybrid optical disc, the HD layer shown in FIG. 2B is used for master preparation using the high-speed 1-bit audio signal and the CD layer shown in FIG. 2A can record a multi-bit audio signal prepared simultaneously. Thus, a conventional CD player can reproduce the hybrid optical disc in the same way as an ordinary CD. Each of the CD layer and the HD layer has a lead-in zone, a data zone, and a read-out zone arranged in this order from the inner circumference toward the outer circumference.

As has been described above, the HD layer contains the high-speed 1-bit audio signal in the program region, the representative album information and disc-related information in the first management region, and the program-related track information in the second management region.

Hereinafter, a detailed explanation will be given for the first management region and the second management region with reference to the format configuration shown in FIG. 3A to FIG. 3C.

The data zone shown in FIG. 3A includes, as shown in FIG. 3B, a 2-channel stereo area for recording a high-speed 1-bit audio signal of 2-channel stereo and a multichannel area for recording a multichannel sound within its audio area. Moreover, the data zone includes a file system area, a master TOC (table of contents) area containing management information identifying the disc contents, and an extra data area.

The aforementioned 2-channel stereo area contains a track information (2-channel stereo audio tracks) consisting of n tracks (Track 1, 2, 3, ..., n) (not depicted) which is preceded by an area TOC-1 and followed by an area TOC-2 as shown in FIG. 3B.

In the hybrid optical disc, the aforementioned master TOC area can be used as the first management region. Moreover, the two area TOCs (area TOC-1 and area TOC-2) can be used as the second management region. It should be noted that it is also possible to use only one of the two area TOCs as the second management area.

FIG. 3C shows specific examples of album information and disc information recorded in the master TOC area; and track information recorded in the two area TOCs (area TOC-1 and area TOC-2) serving as the second management region.

The album information contains information on the number of discs, album identification number, album genre, album title, and artists. Moreover, the disc information contains information on the disc type, date when the disc was prepared, the disc identification number, disc genre, disc title, disc artist, and disc author. Furthermore, the track information contains information on the title name of the respective tracks, artist name, composer name, genre name, editor name, message, and the International Standard Recording Code (ISRC).

Thus, the album information, the disc information, and the track information are recorded in the aforementioned two management regions which are layered into the upper layer and the lower layer.

That is, as shown in FIG. 3B, when recording a recording content over a plurality of discs, the data zone is used for recording an album information representing all of the discs and disc information inherent to the respective discs, whereas the area TOC-1 and/or area TOC-2 is used for recording a track information related to each of the programs recorded on the disc.

Thus, the aforementioned optical disc having the HD layer can record an information related to each of the tracks such as genre information as well as information related to a disc or an entire album.

Furthermore, it is possible to record a plurality of information items for the album and the disc such as genre information. Accordingly, if the tracks have different genre information items, it is possible to record a plurality of representative genre items.

Moreover, as has been described above, the area (master TOC area) for recording a genre information for an album and a disc is separated from the area (area TOC-1, area TOC-2) for recording a genre information for respective tracks. This enables to effectively recording layered data items.

Figures 4A, 4B:
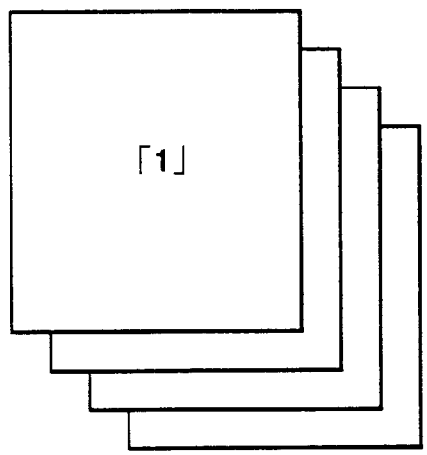
FIG. 4A schematically shows layered tables according to the present invention.
FIG. 4B schematically shows a genre table according to the present invention.

Especially when recording a genre information, the genre information is recorded with a configuration as shown in FIG. 4A and FIG. 4B, consisting of a number indicating the type of the genre table and a genre type in a genre table selected.

For identification of a genre type, an identifier such as a number is assigned for each of the genres. Moreover, for identification of a table (which may be prepared for each of the countries), an identifier is also assigned for the table itself. Thus, by specifying a table identifier and a genre identifier, it is possible to specify a desired genre.

For example, in FIG. 4A, a genre table can be selected by the number "1", and in that table, the index "7" represents a genre type of "Country".

Thus, it is possible to easily switch between tables prepared according to a country or region, and to easily add a novel genre table.

Next, explanation will be given on the optical disc reproduction apparatus 10 for reproducing the HD layer of the hybrid optical disc having the aforementioned configuration with reference to FIG. 5.

Figure 5:
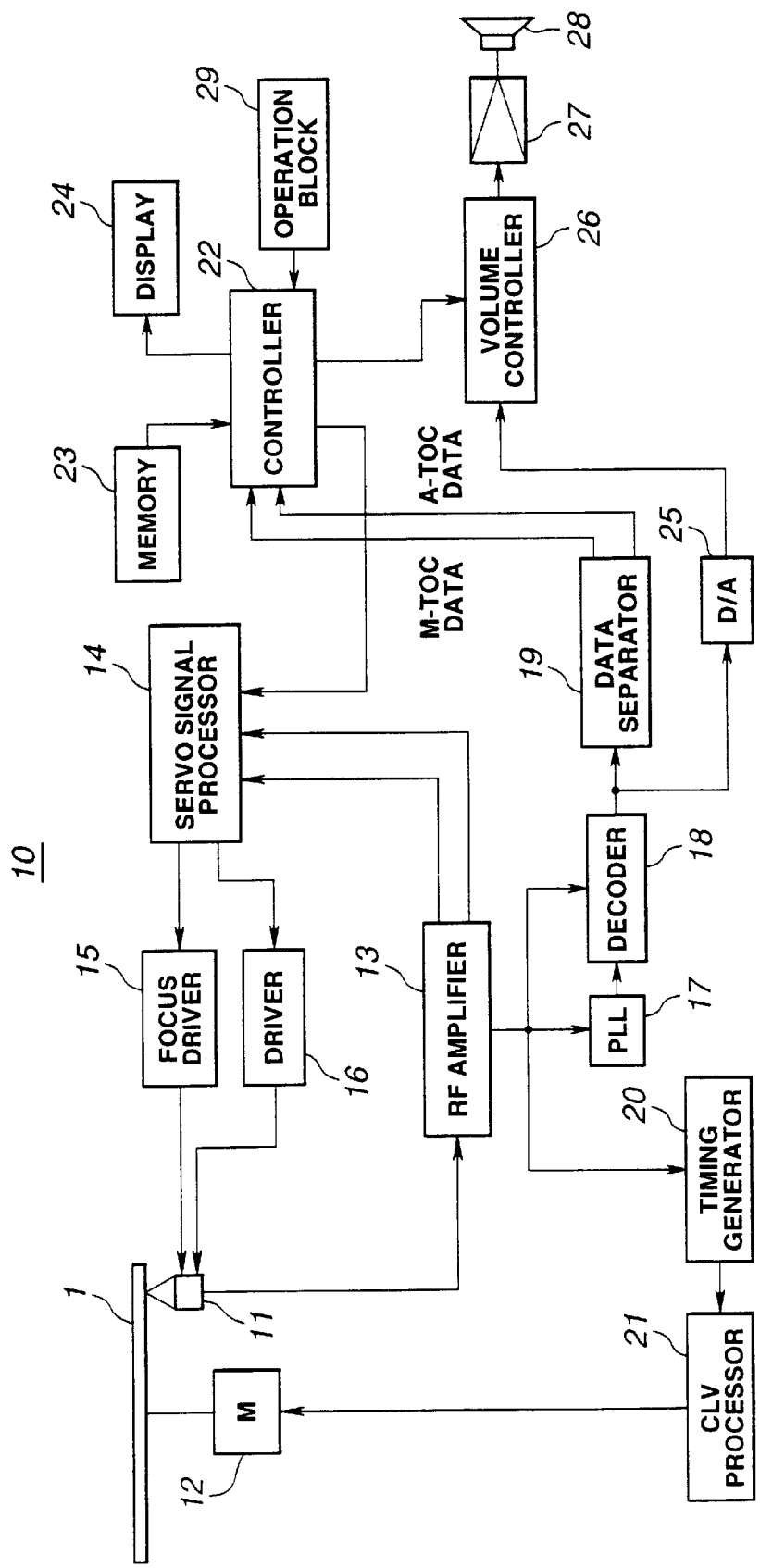
FIG. 5 is a block diagram showing a reproduction apparatus according to the present invention.

This optical disc reproduction apparatus 10 includes, as shown in FIG. 5, an optical read mechanism 11 such as a pickup for obtaining a read-out signal from the HD layer of the hybrid optical disc 1; an RF amplifier 13 for creating a reproduction data from the read-out signal of the optical read mechanism 11; a decoder 18 for performing a decoding processing to the reproduction data from the RF amplifier 13 and for isolating a main data and an information of the aforementioned TOC areas; a data separator 19 to separate the TOC area information from the decoder 18 into a master TOC area data and an area TOC (area TOC-1 and area TOC-2) data; a memory block 23 for storing the master TOC area data and the area TOC (area TOC-1 and area TOC-2) data from the data separator 19 under control of a controller 22; and a display section 24 to display.

Moreover, the optical disc reproduction apparatus 10 further includes: a phase lock loop (PLL) circuit 17 for creating a clock signal synchronized with the reproduction signal from the RF amplifier 13; a servo signal processor 14 for enabling the optical read mechanism 11 to catch up with the optical disc 1 according to an error reproduction signal from the RF amplifier; a focus driver 15 for driving a focus coil constituting the optical read mechanism 11; drivers 16 for driving a tracking coil and sled mechanism; a timing generator circuit 20 for generating a timing signal for rotating the optical disc 1 at a constant linear velocity (CLV); a CLV processor 21 for generating a CLV control signal according to the timing signal from the timing generator circuit 20; and a spindle motor 12 supplied with the CLV control signal from the CLV processor so as to rotate the optical disc at CLV.

Furthermore, the optical disc reproduction apparatus 10 includes: the controller 22 for interpreting the aforementioned TOC data from the data separator 19 and causing a display section 24 to display a graphics information; an operation block 29 connected to this controller 22; a D/A converter 25 for converting a main data M from the decoder 18, into an analog signal; a volume controller 26 controlled by the controller 22 for controlling a volume of an analog audio signal; an amplifier 27; and a speaker 28.

Here, the optical read mechanism 11 includes; an optical lens, a laser mechanism, a detector, a focus coil, and the like. The focus driver 15 for driving the focus coil is controlled by the servo signal processing circuit 14. Moreover, the optical read mechanism 11 also includes a tracking coil for driving the optical lens in the radial direction of the optical disc 1; and a sled mechanism for driving the optical system in the radial direction of the optical disc 1. The respective coils are driven directly by the corresponding drivers 16.

It should be noted that the decoder 18, the data separator 19, the PLL circuit 17, the servo signal processing circuit 14, the timing generator circuit 20, and the CLV processor 21 may be contained in a digital signal processor.

Figure 6:
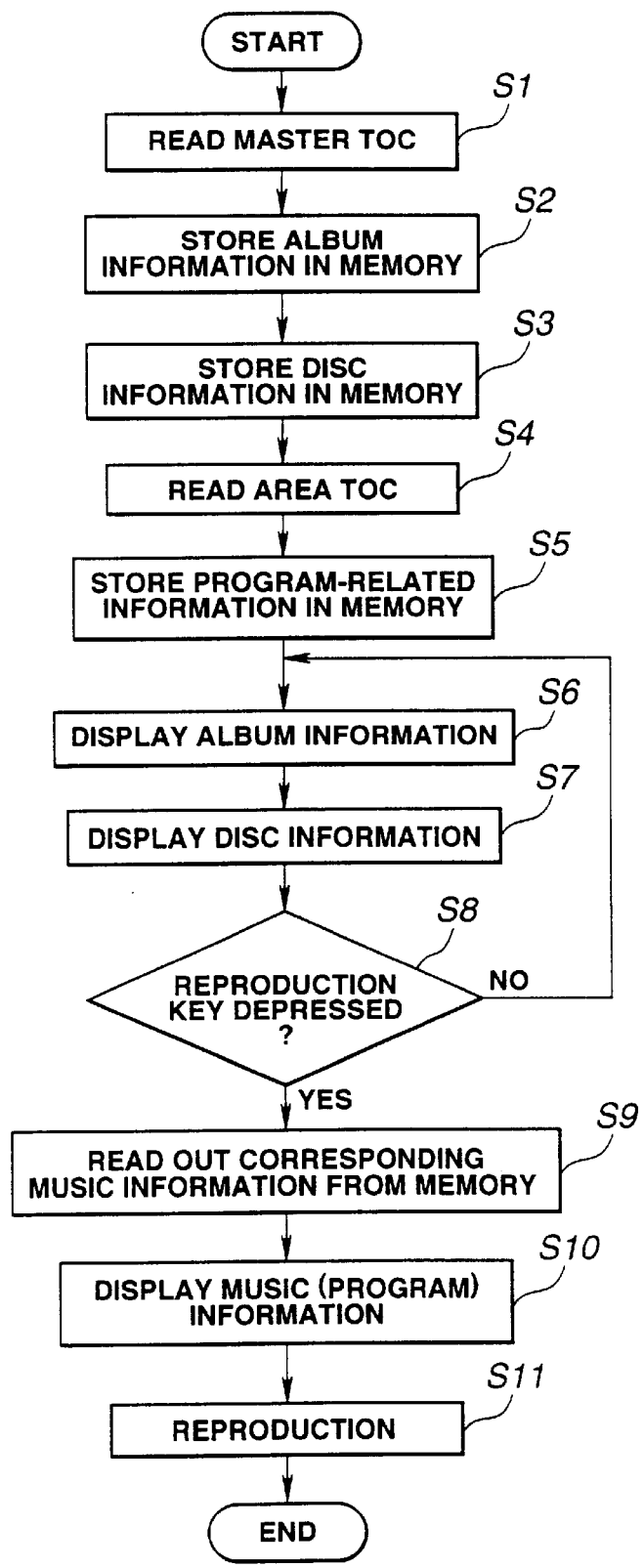
FIG. 6 is a flowchart showing a reproduction procedure according to the present invention.

Next, explanation will be given for the operation of the optical disc reproduction apparatus 10 having the aforementioned configuration with reference to a flowchart of FIG. 6. This operation is performed under control of the controller 22.

Firstly, step S1 reads the Master TOC sent from the data separator 19, step S2 stores an album information name in the memory block 23, and step S3 stores a disc information in the memory block 23.

Next, the Area TOC is read in step S4, and step S5 stores an information corresponding to respective programs, i.e., a track information in the memory block 23.

Next, in step S6, the album information is displayed on the display block 24 and in step S7, the disc information is displayed on the display block 23.

Next, if step S8 decides that "Reproduction key" has been depressed in the operation block 29, control is passed to step S9 where a track information of a corresponding music (program) is read out from the memory block 23, displayed in step S10, and reproduced in step S11.

On the other hand, if step SS decides that the "Reproduction key" has not been depressed, control is returned to step S6.

Thus, according to this optical disc reproduction apparatus, it is possible to perform various retrieval and reproduction using the album information, disc information, and track information layered when recorded on the optical disc 1.

As has been described above, according to the present invention, it is possible to record, for example a genre information for each of the tracks (programs). Moreover, it is possible to record a genre information for an album consisting of a plurality of recording media. Moreover, for one recording medium (such as a disc) and an album, it is possible to record a plurality of genre information items without requiring to select one of them.

Furthermore, it is possible to cope with a case of a collection consisting of genres restricted to particular countries. Moreover, the layered configuration of the genre information items facilitates management of the genres. The reproduction apparatus according to the present invention enables to perform various types of retrieval and reproduction.

Furthermore, by switching between the tables, it is possible to cope with genre types which depend on particular countries or regions. Moreover, it is possible to easily add a table defining a novel genre type.

The recording medium according to the present invention enables to record a program-related information recorded on respective tracks and a disc information inherent to a particular recording medium as well as a representative information representing a plurality of recording media containing a particular recording content, together with the program.

Moreover, the reproduction apparatus and method according to the present invention enables to perform various types of retrieval and reproduction using the aforementioned information items when reproducing the aforementioned recording medium.

What is claimed is:

1. A recording medium for storing data on a plurality of tracks, the recording medium comprising:

a program area for recording data on said tracks;

a first management area for recording album information including a number of discs included in an album and an album identification number, and for managing disc information corresponding to each of said discs included in said album; and a second management area located in said program area for recording data for managing track information related to said tracks recorded on said program area.

2. The recording medium as claimed in claim 1, wherein said album information further includes one of an album genre, an album title, and an album artist.

3. The recording medium as claimed in claim 1, wherein said disc information includes one of a disc type, a disc production date, a disc identification number, a disc genre, a disc title, an artist name, and a producer name.

4. The recording medium as claimed in claim 1, wherein said track information includes one of a name of an artist, a name of an arranger, song lyrics, a title, a genre, and an international standard recording code.

5. A reproduction apparatus for reproducing information from a recording medium adapted to store data on a plurality of tracks, said recording medium including a first management area containing album information including a number of discs included in an album and an album identification number, and data for managing disc information corresponding to each of said discs included in said album, a second management area located in a program area and containing data for managing track information related to said tracks recorded on said recording medium, and said program area containing said programs, said reproduction apparatus comprising:

reproduction means for reproducing said album information and said disc information recorded in said first management area and for reproducing said track information recorded in said second management area;

storage means for storing said album information and said disc information recorded in said first management area and for storing said track information recorded in said second management area; and display means for selectively displaying said album information, said disc information, and said track information.

6. A reproduction method for reproducing information from a recording medium adapted to store data on a plurality of tracks, said recording medium including a first management area containing album information including a number of discs included in an album and an album identification number, and data for managing disc information corresponding to each of said discs included in said album, a second management area located in a program area for managing track information related to said tracks recorded on said recording medium, and said program area containing said programs, said reproduction method comprising the steps of:

reproducing said album information and said disc information recorded in said first management area and storing said album information and said disc information;

reproducing said track information recorded in said second management area and storing said track information; and selectively displaying said album information, said disc information, and said track information.

* * * * *